United States Patent
Marchand et al.

(10) Patent No.: US 9,837,175 B2
(45) Date of Patent: Dec. 5, 2017

(54) METHOD FOR CHEMICALLY STABILIZING URANIUM CARBIDE COMPOUNDS, AND DEVICE IMPLEMENTING THE METHOD

(75) Inventors: Mickael Marchand, Nevers (FR); Olivier Fiquet, Venelles (FR); Méryl Brothier, Aix en Provence (FR)

(73) Assignee: Commissariat A L'Energie Atomique et aux Energies Alternatives, Paris (FR)

( * ) Notice: Subject to any disclaimer, the term of this patent is extended or adjusted under 35 U.S.C. 154(b) by 0 days.

(21) Appl. No.: 14/235,013

(22) PCT Filed: Jul. 17, 2012

(86) PCT No.: PCT/EP2012/063948
§ 371 (c)(1),
(2), (4) Date: Feb. 24, 2014

(87) PCT Pub. No.: WO2013/014022
PCT Pub. Date: Jan. 31, 2013

(65) Prior Publication Data
US 2014/0171724 A1  Jun. 19, 2014

(30) Foreign Application Priority Data
Jul. 26, 2011 (FR) ..................... 11 56795

(51) Int. Cl.
G21F 9/00  (2006.01)
G21F 9/30  (2006.01)
C01B 31/30  (2006.01)
G21F 9/28  (2006.01)

(52) U.S. Cl.
CPC ............. *G21F 9/30* (2013.01); *C01B 31/306* (2013.01); *G21F 9/28* (2013.01)

(58) Field of Classification Search
CPC ............ C01B 31/306; G21F 9/28; G21F 9/30
USPC ........................................................ 588/320
See application file for complete search history.

(56) References Cited

U.S. PATENT DOCUMENTS 3,208,818 A * 9/1965 Stoops et al. ................. 252/642

FOREIGN PATENT DOCUMENTS

| EP | 0297738 A1 | 6/1988 |
|----|---|---|
| JP | S43-21176 Y1 | 9/1968 |
| JP | S50-1672 B1 | 1/1975 |
| JP | H08-160185 A | 6/1996 |
| RU | 2379775 * | 1/2010 |
| WO | 2004012206 A2 | 2/2004 |

OTHER PUBLICATIONS

Translation of RU 2379775, Jan. 2010.*
H.P. Nawada, et al., "Thermogravimetric Study of the Oxidation Behaviour of Uranium Dicarbide", Journal of Thermal Analysis, 1989, pp. 1145-1155, vol. 35, No. 4, URL:http://www.akademiai.com/content/p0r5727lmh079t35/, XP055021705.
M. Bradely et al., "Hydrolysis of Uranium Carbides Between 25 and 100°.I. Uranium Monocarbide", Inorganic Chemistry, 1962, vol. 1, No. 3, pp. 683-687.
M. Bradely et al., "Hydrolysis of Uranium Carbides Between 25 and 100°.II. Uranium Dicarbide, Uranium Metal-Monocarbide Mixtures, and Uranium Monocarbide-Dicarbide Mixtures", Inorganic Chemistry, 1964, vol. 3, No. 2, pp. 189-195.
L. Litz et al., "Preparation and Structure of the Carbides of Uranium", American Chemical Society, 1948, vol. 70, pp. 1718-1722.
S. K. Mukerjee et al., "The Oxidation of Uranium Monocarbide Microspheres", Journal of Nuclear Materials, 1994, vol. 210, pp. 97-106.
E. W. Murbach et al., "Pyrochemical Reprocessing of Uranium Carbide Summary Report", NAA-SR-11340 Metals, Ceramics and Materials, 38 pages.
H. P. Nawada et al., "Thermogravimetric Study of the Oxidation Behaviour of Uranium Dicarbide", Journal of Thermal Analysis, 1989, vol. 35, pp. 1145-1155.
T. Omichi et al., "The Oxidation of UC and UN Powder in Air", Journal of Nuclear Science and Technology, 1968, vol. 5, No. 11, pp. 600-602.
K. A. Peakall et al., "Oxidatin of Uranium Monocarbide", Atomic Energy Research Establishment—R3844, Sep. 1961, 18 pages.
Keiji Naito et al., "Isothermal Oxidation, of Uranium Monocarbide Powder under Controlled Oxygen Partial Pressures," Journal of Nuclear Science and Technology, vol. 13, No. 5, pp. 260-267, May 1976.
Office Action in Japanese Patent Application No. 2014-522031, dated Mar. 22, 2016.

* cited by examiner

*Primary Examiner* — Steven Bos
(74) *Attorney, Agent, or Firm* — Baker Hostetler LLP

(57) ABSTRACT

A process for chemical stabilization of a uranium carbide composite material: $UC_x+yC$ with $x \geq 1$ and $y>0$, placed in a stabilization chamber, comprises: a rise in chamber internal temperature for oxidation of the compound based on uranium carbide between approximately 380° C. and 550° C., the chamber being fed with a neutral gas; isothermal oxidative treatment at the oxidation temperature, the chamber being placed under $O_2$ partial pressure; controlling completion of stabilization of the compound, comprising monitoring the amount of molecular oxygen consumed and/or carbon dioxide or carbon dioxide and carbon monoxide given off, until achievement of an input set-point value for the amount of molecular oxygen, of a minimum threshold value for the amount of carbon dioxide or minimum threshold values for the carbon dioxide and carbon monoxide. A device implements the process.

9 Claims, 6 Drawing Sheets

METHOD FOR CHEMICALLY STABILIZING URANIUM CARBIDE COMPOUNDS, AND DEVICE IMPLEMENTING THE METHOD

CROSS-REFERENCE TO RELATED APPLICATIONS

This application is a National Stage of International patent application PCT/EP2012/063948, filed on Jul. 17, 2012, which claims priority to foreign French patent application No. FR 1156795, filed on Jul. 26, 2011, the disclosures of which are incorporated by reference in their entirety.

FIELD OF THE INVENTION

The field of the invention is that of methods for treating compounds based on uranium carbides of generic formula $UC_x$, it being possible for these compounds to be used as target in any device employing uranium carbides, for which it is necessary, subsequent to their use, to stabilize them, and notably in research accelerators (these targets being regarded as waste after they have been used) which have to meet the criteria of acceptability imposed by nuclear safety authorities, based notably on their chemical stability under normal storage conditions (at ambient temperature and pressure).

BACKGROUND

This is because research accelerators use $UC_x$ targets as sources of heavy ions, in particular at the GANIL (Grand Accélérateur National d'Ions Lourds [French National Heavy Ion Large Accelerator]) at Caen with the SPIRAL 2 (Système de Production d'Ions Radio-Actifs en Ligne de 2ème Génération [$2^{nd}$ Generation In-Line Radioactive Ion Production System]) facility.

The target material $UC_x$, which can be used in the context of the operation of research accelerators, is conventionally synthesized by carbothermic reduction starting from a superstoichiometric mixture of graphite and of $UO_2$ powder and then compressed to form centimeter-sized pellets. Its structural composition is mainly made up of two phases: a uranium dicarbide $UC_2$ phase predominantly constituting the target material (at a level of 90% by weight) and another phase composed of free carbon, denoted $C_F$, present in the graphitic form. In terms of distribution by volume, the latter, conventionally present at a level of 70%, can eventually occupy, in the final $UC_x$ material, values ranging from 0% to more than 75%. Very slight traces of UC can also be present in the initial material (typically less than 1%), which are synthesized locally during the carbothermic reduction stage.

It should be noted that the actual material to be stabilized, once irradiated, can include fission/activation products, such as Co, Cs, B, Br, Kr, Zr, Rh, and the like.

Generally, the stabilization methods should make it possible to respond to the following constraints:

the conversion of the $UC_x$ material into the form of a stabilized product of $UO_x$ type ($U_3O_8$, $UO_2$, $UO_3$, and the like) has to be compatible with the requirements of the outlets/storage areas envisaged by the nuclear safety authorities and ANDRA, the French national agency for the management of radioactive waste;

the application of a process for the stabilization of the $UC_x$ materials via a specific oxidative heat treatment must make it possible to control the oxidation reaction, which is highly exothermic, and to banish any phenomenon of uncontrolled runaway during the reaction;

the control, by a parametric and bounded range, of the chemical reactivity of the material (limitation of thermal runaway, selectivity of the oxidation reaction, control of the ignition temperature) during the process for the oxidative treatment of the $UC_x$ materials, in order to prevent any erratic operation. FIG. 1 thus illustrates the sudden and uncontrolled recovery in reactivity and more specifically an example of thermal runaway characterized by a pseudoperiodical overheating during the oxidation of a sample of uranium metal at 390° C. (Yves Adda, Etude cinétique de l'oxydation de la nitruration et de l'hydruration de l'uranium [Kinetic study of the oxidation, nitridation and hydridation of uranium], French Atomic Energy Commission Report No. 757, (1958);

the possibility of minimizing the production of gaseous discharges and of effluents, always expensive and restrictive for the environment of nuclear technology, by the use of an optimum operating range for the process which makes it possible to completely and solely stabilize the $UC_2$ phase while prohibiting the oxidation with the excess free carbon present in the $UC_x$ material. The eventual objective is to make use of a process in a nuclear environment (shielded cell) by a simple treatment method which does not generate liquid effluents;

the confirmation of the absence of reactivity of the products once the latter are stabilized in the oxidized form, the final material having to be stable with regard to the reactivity with the air and under ambient temperature and pressure conditions;

the use of a stabilization process compatible with semi-industrial operating requirements: reduced treatment time, robustness of the process, notably with regard to the variability in the input (weight of material, density, porosity, phases) and controlling monitoring indicators throughout the process.

Currently, $UC_x$ targets which have already been used are stored in the expectation of a suitable outlet and/or of a treatment process; this is the case, for example, in the ISOLDE (Isotope Separator On Line Detector) facility at Geneva.

Chemical reprocessing methods have already been described, notably in the international patent application: WO/2004/012206, which presents a process for electrochemical oxidation by the dissolution route. The treatment proposed renders it completely incompatible with the $UC_x$ material targeted as the application of this process generates a considerable amount of liquid effluents (resulting from a chemical dissolution) not corresponding to the objectives desired in the present invention.

There also exist scientific publications relating to the oxidation of uranium-comprising carbides of $UC/UC_2$ type which can be categorized chiefly into three main families according to the nature of the oxidant employed: carbon dioxide, liquid water or water in the vapor form, and molecular oxygen, at different concentrations.

As regards the oxidation reactions of actinide carbides with $CO_2$, the authors Peakall, K. A. and Antill J. E., Oxydation of Uranium Monocarbide, *J. Less-Common Metals*, 4 (1961), 426-435, record oxidation studies carried out on UC under an atmosphere of carbon dioxide as oxidizing gas. The results obtained mention that the reactivity of the carbides with $CO_2$ is relatively slow and incompatible with the objective of providing an industrial process (notably with regard to the treatment time criteria). Murbach et al., E. W. and G. E. Brand, 1965, "Pyrochemical reprocessing of uranium carbide", *Summary Report, Atomics International*, page 38, furthermore observed reactivities which are highly variable, as a function of the morphological nature of the UC, which result in unfinished and incomplete oxidation cycles, which is unacceptable for the targeted application. On the whole, these observations, relating to a significant decrease in the kinetics for the oxidation of carbides in the presence of $CO_2$, are incompatible with the requirements imposed and mentioned above for the reprocessing of the material formed of $UC_x$ targets, which restrict in favor of a faster conversion.

As regards the reactions for the oxidation of actinide carbides with water in the liquid form and in the vapor form, several studies given below by way of example, including those mentioned in the following papers: Bradley, M., "Hydrolysis of Uranium Carbides between 25 and 100° C.", II Uranium Dicarbide, Uranium Metal Monocarbide Mixtures and Uranium Monocarbide-Dicarbide Mixtures, *Inorganic Chemistry*, 3 (1964), 189-195, Herrmann, B. and Herrmann, F. J., Cinétique d'oxydation du mono carbure d'uranium par l'oxygène sec ou humide [Kinetics of oxidation of uranium monocarbide by dry or humid oxygen], *French Atomic Energy Commission Report*, 19 (1968), show that carbides react with water and water vapor. The results mention that the water vapor is an important vector of the oxidation mechanism and that the pre-exposure to air or to a weakly oxidizing humid atmosphere significantly increases their reactivity. It should be noted that the treatments for the oxidation of carbides with water in the liquid form are entirely unsuitable for the process envisaged with the material formed of $UC_x$ targets from the viewpoint of the major constraints related notably to the treatment of the effluents which this would subsequently generate. Although the presence of water vapor has the effect of increasing the reactivity of the carbides, notably hyperstoichiometrically, by a faster rate of conversion into the oxide phase, the oxidation studies presented in these papers under an anisothermal atmosphere and only in the presence of water vapor alone exhibit two major disadvantages for the definition of a process suited to the material based on uranium carbide which is the subject matter of the stabilization process of the present invention because:

of a slower conversion of the carbides into the oxide phase in the presence of water vapor alone and in the presence of molecular oxygen under similar oxidation conditions;

of the formation of new gaseous products, as described in Litz, M., Uranium Carbides: "Their Preparation, Structure and Hydrolysis", PhD Thesis, Ohio State University, NP-1453 (1945): $CH_4$ (for UC), $C_2H_6$ (for $UC_2$) and in particular the production of molecular hydrogen $H_2$ (whether this is from UC or from $UC_2$), in potentially large amounts, the potentially explosive nature of which is highly damaging to the safety of the process. The result of this is that none of the results obtained in the presence of water vapor, predominantly on UC, is directly transposable to the requirement specified for the $UC_x$ material as a result of the constraints presented above and also the nature of the variability in the input (high content of excess carbon, which results in an additional increase in $H_2$ by hydrolysis/gasification unless specific precautions are taken.

Finally, regarding the reactions for the oxidation of UC and of $UC_2$ with $O_2$, many studies have been published on the oxidation of uranium-comprising carbides under an atmosphere of molecular oxygen at different contents. Nevertheless, it should be pointed out that these studies, except for those of Nawada H. P. et al., Thermogravimetric study of the oxidation behaviour of uranium dicarbide, *Journal of Thermal Analysis*, 35 (1989), 1145-1155, relate to the UC material of stoichiometric composition and which is consequently substantially different in nature and behavior from the multiphase $UC_x$ material targeted by the present invention, the latter being composed of two main phases (of uranium carbide and of free carbon in the graphitic form). The only data available with regard to stoichiometric $UC_2$ also show different types of behavior toward oxidation as a result of the absence of free carbon, which itself also changes during a stabilization treatment as a function of the parametric range and the operating conditions applied.

Generally, for the application of oxidative heat treatments, two main routes can be dissociated:

an oxidative treatment of the carbides carried out at variable temperatures (anisothermal conditions);

an oxidative treatment of the carbides applied at a fixed temperature (isothermal conditions).

Anisothermal oxidation conditions are incompatible for the application of a stabilization process according to the present invention as they do not make it possible to guarantee stable, safe and reproducible oxidation conditions. This is because a gradual increase in the temperature applied during the treatment and consequently the introduction of energy in the form of heat into the system results in a risk of uncontrolled runaway and in unstable conditions for the oxidation of the carbides which leads to:

a sudden increase in the local temperature and in the oxidation kinetics (as illustrated in FIG. 1);

an uncontrolled runaway of the reaction and a potential spontaneous self-ignition of the $UC_x$ material (very particularly in the powder form) which is accompanied by a strong exothermic peak on the basis of an oxidation reaction enthalpy of the order of −1450 kJ/mol.

In order to prevent these phenomena and to run a process by moderating the supply of the oxidizer starting from a predefined combustible charge and a predefined activation temperature (principle of safety of operation furthermore relevant in order to demonstrate the control of the process), an oxidative treatment under an isothermal atmosphere has to be envisaged.

Furthermore, structural and morphological differences greatly influence the behavior toward oxidation of uranium-comprising carbides, such as:

the initial nature of the material: UC has a different behavior toward oxidation than $UC_2$ (difference in weight gain), which is also valid for $UC_x$ rich in excess carbon;

the morphology: a powder has a substantially different ignition temperature from one or more pellets having predefined volumes and predefined densities (influence, for example, of the height of the powder bed, of the weight treated, and the like).

The known oxidation techniques include notably several oxidation studies carried out on UC obtained by carbothermic reduction in the powder form under isothermal conditions and notably that described in the paper by Ohmichi, T. (1968), "The Oxidation of UC and UN Powder in Air", *Journal of Nuclear Science and Technology*, 5, 600-602. The detailed analysis of the results shows that the data cannot be transposed to target materials of $UC_x$ type due to several constraints: a limited initial amount of material (UC weight of less than 30 mg), a range of application of oxidation temperatures which are excessively high (up to 1400° C.), in combination with a composition and with a geometric shape of the intial carbide which is different: the UC does not provide the same weight gain as the $UC_2$ under oxidation and the geometry of the UC (powder with a particle size of 150 μm) is not representative of the $UC_x$ targets to be stabilized targeted in the present invention (comparable for the majority of them to porous centimeter-sized pellets).

Other studies carried out on bulk UC, such as those of Herrmann, "Cinétique d'oxydation du mono carbure d'uranium par l'oxygène sec ou humide [Kinetics of oxidation of uranium monocarbide by dry or humid oxygen]", *French Atomic Energy Commission Report*, 19 (1968), also show profiles for variations in weight which are substantially different from those obtained with $UC_x$ target materials as a result of the difference in the initial content of the carbon in the carbide phase (increase greater than 60% in the weight gain for the formation of one and the same oxide $U_3O_8$ between the UC and the $UC_2$ oxidized under similar conditions).

S. K. Mukerjee, G. A. R. Rao, J. V. Dehadraya, V. N. Vaidya, V. Venugopal and D. D. Sood (1994), "The Oxidation of Uranium Monocarbide Microspheres", *Journal of Nuclear Materials*, 1, 97-106, and E. W. Murbach and G. E. Brand, 1965, "Pyrochemical Reprocessing of Uranium Carbide", Summary Report, page 38, Atomics International, have also analyzed the effect of the initial weight of UC (from 30 to 200 mg for Mukerjee and up to 10 kg for Murbach) on the kinetics of oxidation. The results presented show that they cannot be transposed for the material based on uranium carbide of the present invention as the studies were not carried out under isothermal conditions (Mukerjee) and the UC samples had been initially synthesized by arc melting (Murbach), consequently exhibiting structural properties in terms of bulk density which are radically different from those of the material based on uranium carbide of the present invention.

The few facts available with regard to the oxidation of $UC_2$ and thus the facts most representative for the targeted process vis-à-vis the structural composition of the $UC_x$ targets relate to oxidation studies carried out by Nawada et al., Thermogravimetric Study of the Oxidation Behaviour of Uranium Dicarbide, *Journal of Thermal Analysis*, 35 (1989), 1145-1155. The oxidative treatments brought to the $UC_2$ were carried out under anisothermal conditions, followed by lengthy oxidation stationary states ranging from 4 to more than 100 hours. The complete oxidation cycle was consequently spread over a total time of 118 hours. The results obtained could be divided into 4 stages in order to make it easier to understand the reaction for the oxidation of the $UC_2$ to give $U_3O_8$:

a first stage characterized by the gradual and very slow oxidation of the $UC_2$ to give the intermediate oxide $\alpha$-$UO_3$ with a weight gain of the order of more than 19% for temperatures varying from 25 to 260° C.;

a second stage characterized by the oxidation of the carbon originating from the initial $UC_2$ phase, which brings about a twofold weight loss, for temperatures ranging from 260 to 410° C.;

a third stage corresponding to the oxidation of the $\alpha$-$UO_3$ phase to give the oxidized $U_3O_8$ phase, which also results in a weight loss, for temperatures ranging from 410 to 560° C.;

a fourth and final stage which is defined by the oxidation of the residual free carbon, assumed to be present in the starting material, for oxidation temperatures of between 560 and 690° C., also accompanied by the recording of a weight loss.

Although this study provides data for understanding the oxidation of the $UC_2$, it presents facts incompatible for the application of a process for the conversion of the $UC_x$ into $U_3O_8$ for several reasons:

unsuitable thermal programming conditions (mixture of anisothermal oxidation conditions, followed by lengthy oxidation stationary states) which do not satisfy the application of an oxidative heat treatment controlling the potential variations in reactivity, essential in order to guarantee the safety of the process;

an excessive oxidation time: the total duration of the oxidation of the $UC_2$ in this study is estimated at more than 118 hours, which renders it incompatible with a semi-industrial treatment which requires the application of a process for the rapid conversion of the carbide phases into $U_3O_8$;

lack of input data, such as, for example, the initial $UC_2$ weight (not mentioned) or the absence of physical properties of the $UC_2$ input material (in terms of density, porosity, geometry of the pellets), which do not guarantee flexibility with regard to the oxidative treatment presented. The data provided in this study show that the material is furthermore rather different from the abovementioned $UC_x$ material (notable difference in stoichiometry of the free carbon in the initial material substantially modifying the behavior toward oxidation);

the absence of relative results related to the chemical reactivity of the $UC_2$ during the various oxidation stages (enthalpy of each of the intermediate oxidation reactions) but also the variation in the output quantities measured (weight produced, $CO_2$ gas produced) as a function of the input parameters (weight, $O_2$ concentration).

These missing facts show that this study, relevant notably for the understanding of the mechanism of oxidation of the $UC_2$, does not make it possible to define a process as it is incompatible with the requirements of safety of a stabilization process with regard to the management of the thermal runaway and the control of the oxidation reaction by the managed introduction of an $O_2$ partial pressure, of a controlled flow rate and of a suitable weight. Furthermore, the criteria which make it possible to guarantee the end of the reaction, apart from a total treatment at high temperature which is not compatible with the objectives/constraints related to the present invention, are not identified.

From the viewpoint of all the data existing in the bibliography, it appears that no oxidative heat treatment can be adapted to the material consisting of uranium carbide targets, having a hyperstoichiometric carbon composition, which guarantees a treatment for the conversion of the $UC_x$ to $UO_x$ by a rapid, safe and robust oxidation process corresponding to the desired functions mentioned above.

SUMMARY OF THE INVENTION

This is why the present invention provides a solution for solving the complex problem of the stabilization, in a safe, manageable, robust and accelerated fashion, of a composite material of formula UCx+yC, with x being able to be equal to or greater than 1, y being greater than 0.

The solution of the present invention makes it possible to have available an industrial process which takes into account the constraints related to the need to restrict the production of gaseous or liquid effluents (operation in a nuclear environment inside shielded cells) while meeting the requirements/outlets imposed by the safety authorities with regard to the conversion of the $UC_x$ into waste of $UO_x$ types (mainly $U_3O_8$), this being achieved by a stabilization treatment controlled at any instant of the reaction.

More specifically, a subject matter of the present invention is a process for the chemical stabilization of a uranium carbide compound corresponding to the formula:

$UC_x+yC$ with $x \geq 1$ and $y>0$, placed in a stabilization chamber, characterized in that it comprises the following stages:
- a stage of rise in temperature of the internal temperature of said chamber to a temperature for oxidation of said compound based on uranium carbide of between approximately 380° C. and 550° C., said chamber being fed with a neutral gas;
- a stage of isothermal oxidative treatment at said oxidation temperature, said chamber being placed under $O_2$ partial pressure;
- a stage of controlling the completion of the stabilization of said compound which comprises the monitoring of the amount of molecular oxygen consumed and/or of carbon dioxide given off or of carbon dioxide and carbon monoxide given off, until at least the achievement of a value of an input set point for the molecular oxygen, of a minimum threshold value for said amount of carbon dioxide or of threshold values for the carbon dioxide and carbon monoxide.

According to an alternative form of the invention, the stage of controlling the completion of the stabilization additionally comprises the monitoring of variation in weight of the solid compounds based on carbon and uranium in the chamber, an increase in weight being correlated with the oxidation of uranium carbide in progress.

According to an alternative form of the invention, the stage of controlling the completion of the stabilization is carried out by the application of a rise in temperature of the internal temperature of said chamber between said oxidation temperature and the temperature of oxidation of the carbon (temperature excluded) and monitoring the presence of $CO_2$ given off.

According to an alternative form of the invention, the process comprises the introduction of a water vapor partial pressure into said chamber before and/or during the oxidation stage. Advantageously, it can then comprise the detection of $H_2$ as marker for monitoring the end of oxidation in said chamber.

According to an alternative form of the invention, the stage of controlling the completion of the stabilization is carried out by the introduction (at the assumed end of treatment, that is to say on crossing in a downward direction the threshold for the $CO_2$) of an amount of water vapor into said chamber at the oxidation temperature and the monitoring of the content of $H_2$ in the chamber which, if it is less than a threshold, makes it possible to confirm the end of the reaction for the oxidation of the $UC_x$.

According to an alternative form of the invention, the stage of controlling the completion of the stabilization comprises an operation of overpressurizing the reaction gases present in said chamber so as to accelerate the end of the reaction for the oxidation of said compound.

According to an alternative form of the invention, the stage of controlling the completion of the stabilization additionally comprises a cycle of an operation of overpressurizing and an operation of underpressurizing the reaction gases present in said chamber.

According to an alternative form of the invention, the process comprises a preliminary stage of determination of an optimum oxidation temperature by thermogravimetric analysis of a sample of $UC_x+yC$ compound.

According to an alternative form of the invention, the optimum oxidation temperature, which varies as a function of the conditioning of said uranium carbide, is between approximately 380° C. and 550° C.

In the process according to the invention, said compound can exhibit a morphology of powder type or of porous or dense pellet type.

Another subject matter of the invention is a device for the chemical stabilization of a uranium carbide compound comprising a chamber comprising an oxidation furnace, characterized in that it comprises:
- a module for feeding with gas which makes it possible to generate neutral argon or nitrogen atmospheres or else atmospheres partially oxidizing in $O_2$ and/or $H_2O$ using an external feed circuit, gas flows being sent to said oxidation furnace;
- an electrical feed module feeding the oxidation furnace, sending to it a set-point flow which makes possible the imposition of the temperature;
- said chamber sending an exiting gas flow to a module for regulation and automatic control;
- said module for regulation and automatic control comprising a first module for measurement of temperature and thermal power and a second module for analyzing the various amounts of gas present in the oxidation furnace, sending a set-point flow to said means for feeding with gas and to said electrical feed means.

According to an alternative form of the invention, the module for feeding with gas comprises a circuit which generates water vapor, coupled to a regulator of water vapor pressure, an argon or nitrogen feed, an argon and/or molecular oxygen feed, coupled to a regulator of molecular oxygen pressure.

The module for regulation and automatic control, thus comprising a module which makes possible measurements of temperature and thermal power and a module for analyses of concentrations of different gases, such as $O_2$, $CO_2$, CO, $H_2O$ and $H_2$, makes it possible to carry out a continuous feedback adjustment of the parameters for running the process, such as the oxidizing partial pressure, the stabilization temperature, by monitoring in real time the temperature and the thermal power of the oxidation furnace.

According to an alternative form of the invention, said chamber is additionally equipped with means for weighing the solid compounds based on carbon and uranium.

BRIEF DESCRIPTION OF THE DRAWINGS

A better understanding of the invention will be obtained and other advantages will become more apparent on reading the description which will follow, given without implied limitation and by virtue of the appended figures, among which.

DETAILED DESCRIPTION

Figure 1:
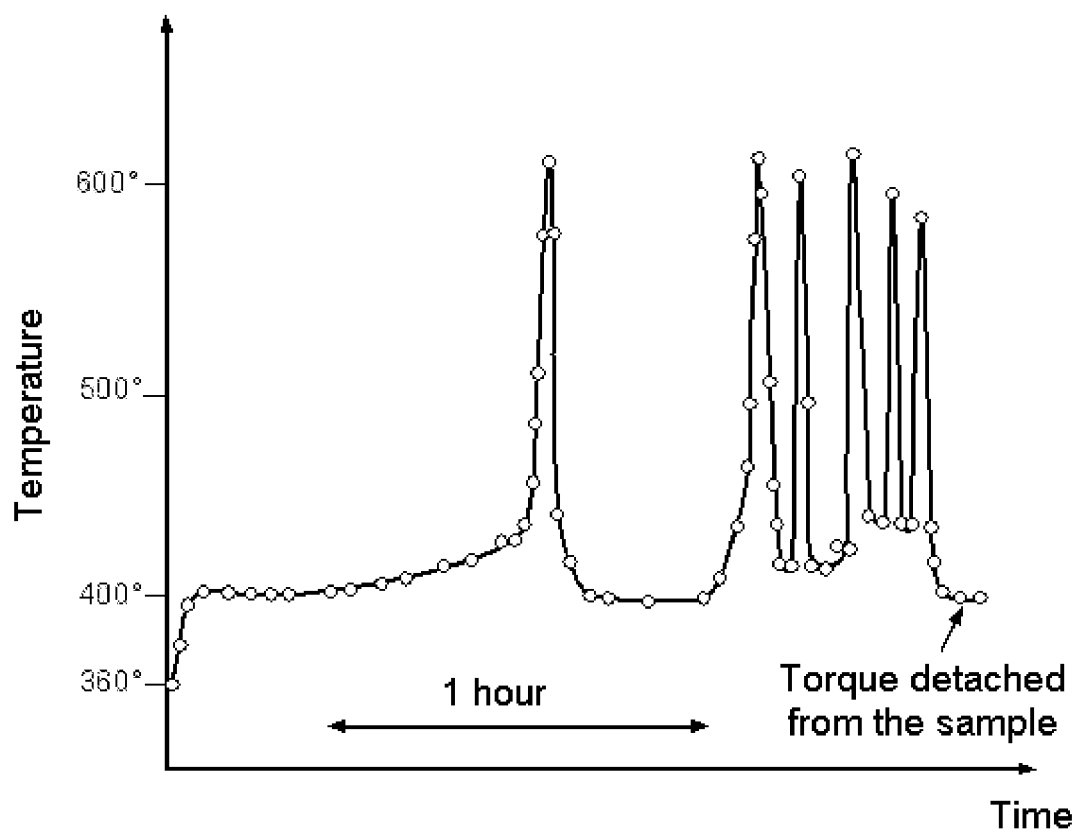
FIG. 1 illustrates an example of thermal runaway characterized by uncontrolled pseudoperiodical overheating during the oxidation of a sample of uranium metal at 390° C.

Generally, the process of the present invention comprises:

bringing the material to temperature under a neutral atmosphere in order to be under the future oxidation conditions;

an operation for controlled stabilization of the $UC_x+yC$ phase by an isothermal oxidative treatment within an optimum temperature range [380° C.; 550° C.] (notably as a function of the nature, of the amount, of the morphology and of the composition of the x and y values of the input material) under an $O_2$ partial pressure (from 5% to 25% of $O_2$) (preferably 10% $O_2$). During this stage, the treatment conditions are chosen in particular in order to make sure that the products are reactive and that this reactivity is controlled solely by the supply of oxygen. Confirmation of the satisfactory progression of the oxidative treatment process is carried out by monitoring, in real time, the molecular oxygen $O_2$ consumed and the carbon dioxide $CO_2$/carbon monoxide CO given off;

an operation for confirming the completion of the stabilization of the composite material. This final stage can notably be carried out by the simultaneous application of a pronounced but controlled increase in the oxidation temperature or the sequential insertion of a water vapor partial pressure having the aim of promoting the oxidation of final $UC_2$ fragments possibly not oxidized during the first oxidation phase or the variation in the pressure of the reaction gases in the process (positive variation (limited to 1 bar max) or negative variation (limited to 1 mbar min)) or else by a combination of two or three alternative forms.

The detection of the reactivity with regard to the contents of the reaction gases (CO, $CO_2$, $H_2$) from this change in conditions makes it possible to reveal the completion of the stabilization reaction without fear of a high reactivity of a portion of the waste which may potentially not yet be stabilized during the preceding stage. In the absence of reactivity of these gases, the halting of treatment is ordered.

The detailed description below has the aim of revealing that, from the viewpoint of the chemical nature of the material to be treated $UC_x+yC$, amounts and volumes which can be involved for notably applications targeted in the present invention, i.e. large amounts of waste to be reprocessed greater typically than several kilograms, the process of the present invention makes it possible to provide complete stabilization of the material in an oxidized form which is stable to air at ambient temperature and pressure by imposing an appropriate treatment temperature with an optimum gas flow rate and an optimum $O_2$ concentration.

In point of fact, the structural specificity of said composite material (two-phase compound notably of $UC_2$, for example, and of free carbon in the graphitic form, structural heterogeneity, high porosity) brings about contradictions in terms of objective, indeed even of physical constraints, which render particularly advantageous different optimizations of the process of the present invention specified in the continuation of the description.

These difficulties are based notably on the following contradictions:

the need to guarantee the stabilization of the $UC_x+yC$ waste without, however, converting all of the carbon (yC) initially present in the $UC_x+yC$ material or present in the form of reaction intermediates resulting from the various oxidation reactions. This is because the complete conversion of these carbon-comprising forms gives off a large amount of gas ($CO_2$, CO mainly) which is highly damaging and thus prejudicial in terms of reprocessing of gas (significant discharge) and of duration of application of a process on a semi-industrial scale. In addition, the choice of complete stabilization of all of the constituents of the $UC_x+yC$ material ($UC_2$, UC and carbon) involves operating at higher oxidation temperatures, which significantly promotes the release of radioactive elements at the departure of effluent gases;

a stabilization specifically adapted to a portion of the constituents of the $UC_x+yC$ material (the $UC_2$, UC carbide phase) is rendered all the more problematic as the reaction for stabilization by oxidation is highly exothermic (difficulty of controlling the reactivity), which conflicts with the targeted objective;

the control of the reactivity is rendered all the more difficult, beyond the phenomena of exothermicity, as it is conditioned by the accessibility of the oxidant to the reaction sites and depends on the byproducts formed ($UO_x$), which can create reaction-limiting barriers which can break more or less suddenly during the treatment.

The process of the present invention thus has to make it possible to control the physical constraints listed above by making use of an optimum operating range in order:

to completely but solely oxidize the $UC_x$ phase without completely incinerating the excess graphite present in the initial material (yC) but also optionally in the target container which can be employed, also composed of graphite and conventionally estimated at more than 1 kg by weight;

to limit the treatment time for stabilization/conversion of the $UC_x$ material by a range of oxidation temperatures which are studied which makes it possible to result in rapid kinetics of oxidation of the $UC_x$ to give $UO_x$;

to limit only the production of $CO_2$ resulting solely from the oxidation of the $UC_x$ to give $U_3O_8/UO_2$ by inhibiting the strong release of $CO_2$ produced by the oxidation of the excess carbon/graphite, the volumes of which, introduced by the $UC_x+yC$ material and the graphite container of the $UC_x$ targets, involve a treatment process which is lengthy to carry out;

to limit the volatility and the propagation of potential fission or activation products by confining them as much as possible within the $UC_x$ targets to be treated by the use of a suitable and moderate oxidation temperature;

to provide a system for running the process which makes it possible to control the chemical reactivity and to confirm good stabilization of the material once the latter has been oxidized by the process;

to prevent any unstable form of oxidation of the $UC_x$ material notably with regard to the variability in the geometry (pellets, powder, spherical beads) and to the nature of the input material based on uranium carbides.

Figure 2:
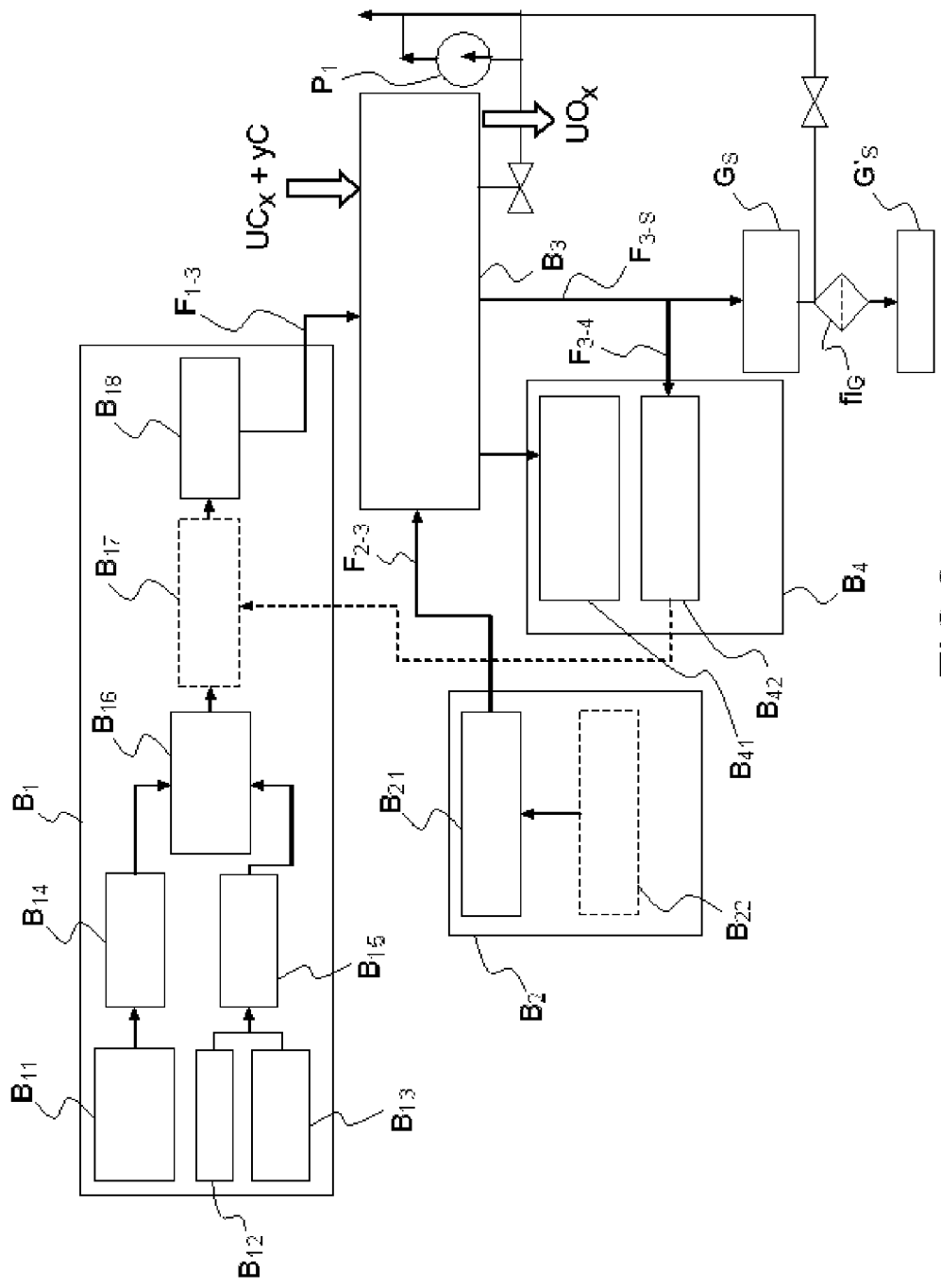
FIG. 2 illustrates a block diagram showing the various means employed to carry out the process of the present invention.

Example of a Device which Makes it Possible to Carry Out the Process for the Stabilization of $UC_x+yC$ FIG. 2 gives a diagrammatic representation of an example of a device which makes it possible to carry out the isothermal oxidative treatment of the compound under $O_2$ partial pressure in an oxidation furnace:

a first module $B_1$ is used to feed with gas and makes it possible to generate neutral atmospheres of argon or nitrogen or else partially oxidizing atmospheres of $O_2$ and/or $H_2O$ using an external feed circuit. These atmospheres are continually adjusted by pressure and flow gauges and then injected into the oxidation furnace in order to stabilize the composite material made of $UC_x+yC$. More specifically, this module $B_1$ can comprise notably a circuit which generates water vapor $B_{11}$, coupled to a regulator of water vapor pressure $B_{14}$, an argon/nitrogen feed $B_{12}$, an argon/molecular oxygen feed $B_{13}$, coupled to a regulator of molecular oxygen pressure $B_{15}$, the two regulators feeding a mixer $B_{16}$ of $O_2$ and/or $H_2O$ in the direction of a regulator of input pressure $B_{17}$ connected to a regulator of gas output flow rate $B_{18}$ in order to feed, via a flow $F_{1-3}$, a chamber corresponding to a third module $B_3$ for stabilization heat treatment comprising an oxidation furnace in which the stabilization of the compound takes place;

a second module $B_2$ for feeding with electricity is provided in order to feed the block $B_3$ via a set-point flow $F_{2-3}$ and comprises a module for feeding with electricity $B_{21}$ and a module for programming $B_{22}$ the stabilization heat cycle suited to the variability in the input composite material;

the third module $B_3$ comprises an oxidation furnace having a regulated atmosphere; it also makes it possible to charge the input material distributed over a boat optimized with respect to the variability in the nature and in the morphology of the input material and then to discharge the stabilized waste for the purpose of potential analyses (in particular the weighing of the final residue and the withdrawal of a sample from the residue in order to carry out characterizations) before being subsequently packaged and stored;

a fourth module $B_4$ is provided in order to provide the functions of regulation and automatic control; it comprises a module $B_{41}$ which makes possible measurements of temperature and thermal power and a module for analyses $B_{42}$ of concentrations of different gases, such as $O_2$, $CO_2$, CO, $H_2O$ or $H_2$. This fourth module makes it possible to carry out a continuous feedback adjustment of the parameters for running the process, notably: the oxidant partial pressure, the stabilization temperature, by monitoring, in real time, the temperature and the thermal power of the oxidation furnace, the consumption of gas ($O_2$, $N_2$, Ar, $H_2O$) and the production of gaseous reactants ($CO_2$, CO, $H_2$, $CH_4$, $C_2H_6$). Optionally, the change in the weight of $UC_x$ during its oxidation is also recorded in order to identify the different oxidation reactions, to distinguish the opposing phases and to monitor the degree of conversion of the charge to be stabilized.

The gas flows exiting from the chamber $F_{3-S}$ are, on the one hand, filtered before discharge via a pump $P_1$ and a filter $fi_G$ to produce gas sample $G'_S$ and, on the other hand, analyzed via a withdrawn gas sample $G_S$ of said gas flow $F_{3-4}$.

Detailed Description of the Different Stages of Implementation in the Process of the Invention in the Context of an Example:

1) The stage of rise in temperature to an oxidation temperature can advantageously be between approximately 380° C. and 550° C. and be carried out in a chamber under an inert atmosphere.

In order to arrive at conditions of oxidation under isothermal conditions, the $UC_x+yC$ material is gradually heated under an inert gas up to the oxidation temperature for the application of the process. The choice of this oxidation temperature depends in particular on the type of furnace and on its performance, on the nature and on the morphology of the input material, on the geometry of the charging boat and on the arrangement of the material to be oxidized inside this boat. Preliminary tests on reduced amounts are potentially necessary to best adjust the treatment temperature (and will be described subsequently in the present description). The duration of this first stage can typically be of the order of approximately sixty minutes.

2) After a period of stabilization under an inert atmosphere (mean duration 60 min), a gas composed of an $O_2$ partial pressure is introduced into the oxidation furnace. Generally, after application of the process at temperatures $T_{oxidation}$ varying from 380 to 550° C., the $UC_x$ material, with the initial chemical composition $UC_2$+graphitic carbon $C_F$ and with geometry of pellets type, is oxidized and forms a homogeneous profuse powder, with the chemical composition $U_3O_8$+graphitic carbon $C_F$. The expansion by volume of the $UC_x$ material after treatment of the process is of the order of 50%. The oxidation of the $UC_x$ material is monitored in real time with a gas analyzer at the outlet of the oxidation furnace. The oxidation treatment is halted when the $O_2$ concentration reaches the imposed inlet value and when the $CO_2$ concentration given off during the oxidation of the $UC_x$ targets is less than a threshold value which can typically be of the order of 100 ppm.

3) The oxidation of the $UC_x+yC$ can advantageously be monitored by the analysis of the change in weight (if the measurement device allows it) and by the measurement in real time of the output gases of the process, in particular: the monitored molecular oxygen $O_2$ of the consumption, the $CO_2$ produced by the oxidation of the $UC_x$ to give the oxide form $UO_x$, optionally the carbon monoxide CO and the molecular hydrogen $H_2$ given off during sequential programmed addition of water vapor during reaction. This is because it can be advantageous to use water vapor also for milder stabilization via a controlled oxidation of the oxygen.

4) The stabilization of the $UC_x$ material is regarded as complete when:

the initial weight of the material to be treated reaches a stabilized weight gain $\Delta m$ compatible with the formation of $UO_x$, mainly $U_3O_8$ (it being possible for the variation in weight $\Delta m$ typically to be between 6% and 10%);

the outlet $O_2$ concentration reaches the imposed inlet value of the process (preferably 10% concentration by volume);

the gases produced, CO, $CO_2$, $H_2$, reach a value lower than a threshold value (typically less than 100 ppm);

the oxidized $UC_x$ material no longer reacts after stresses (absence of thermal reactivity) by a difference in temperature $\Delta T$, in concentration ($\Delta[O_2]$, for example), in humid atmosphere ($\Delta[H_2O]$) or in pressure $\Delta P$.

It should be noted that the stresses can be as follows:

the rapid but controlled increase $\Delta T$ in the oxidative treatment temperature such that $T_{oxidation}+\Delta T<T_{max}$, $T_{oxidation}$ being the temperature of application of the oxidative treatment ($T_{oxidation}$ of between 300 and 550° C.) and $T_{max}$ being the maximum temperature admissible before the oxidation of the excess free carbon ($T_{max}$ in the vicinity of 560° C.), the absence of $O_2$ consumption and of $CO_2$ release during this stress marking the halting of the process;

the variation in the pressure in the furnace. A variation in pressure facilitates the penetration of the gases to the core of the body to be oxidized and promotes the reaction kinetics. To do this, a reduction in pressure ($P_{min}$ in the vicinity of 1 mbar)-compression ($P_{max}$ in the vicinity of 1 bar) cycle can be carried out by virtue of a pumping and solenoid valve system connected to the oxidation furnace;

the addition of a residual content of water vapor either before, during or after the treatment in order to facilitate the preferred oxidation of $UC_x$ materials, in particular having a high specific density, with the preferred oxidation of $UC_2$ beads under a water-comprising oxidizing atmosphere). The addition of water vapor is limited to a maximum of 5% by volume in order to exclude the presence of an atmosphere excessively charged with $H_2$ (maximum admissible safe value 5% $H_2$ as concentration by volume), the gas $H_2$ being generated during the oxidation of the $UC_x$ with the water vapor. The introduction of $H_2O$ at the end of the cycle represents an advantage insofar as this makes it possible to use the $H_2$ as new gas tracer for a specific oxidation of the $UC_x$ and in complete safety in the case of a recovery in the reactivity of the $UC_x$ material, as the amounts produced are then significantly lower owing to the fact that the $UC_x$ material is already stabilized for the most part in the oxidized form and as a result of the limitation of the temperature (gasification reaction impossible for $T_{oxidation} < T_{max}$ and as a result of the limitation of the [$H_2O$] concentration);

it is also possible to carry out a simultaneous combination of the different stresses mentioned above.

Figure 3:
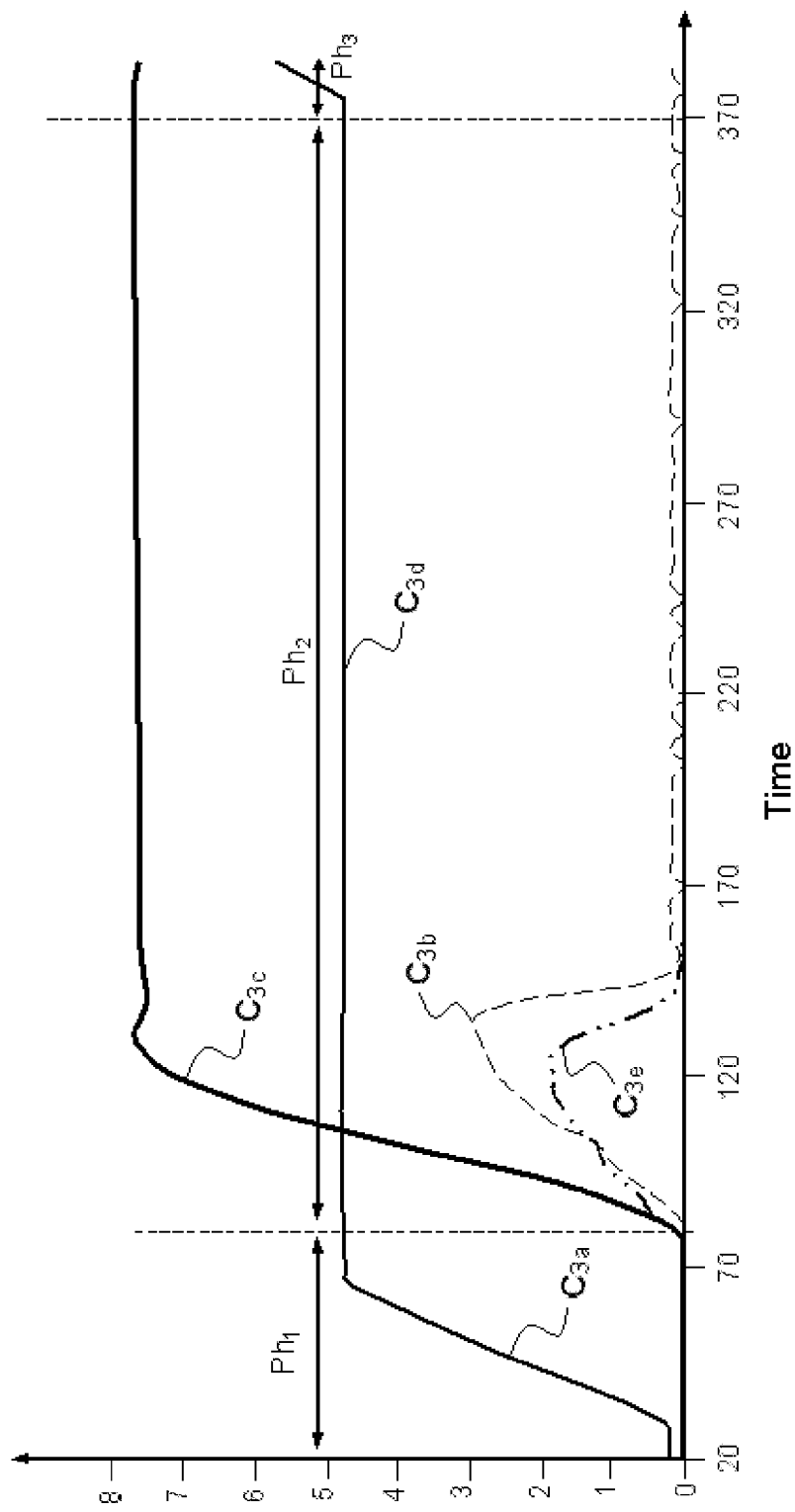
FIG. 3 illustrates the various phases of operations according to the process of the invention.

FIG. 3 illustrates all of these stages, diagrammatically represented as phase $Ph_1$, $Ph_2$ and $Ph_3$. The curve $C_{3a}$ relates to the change in the temperature as a function of the time, the curve $C_{3b}$ relates to the amount of $CO_2$ given off, the curve $C_{3c}$ relates to the change in the weight of the solid compounds, the curve $C_{3d}$ relates to the amount of $O_2$ and the curve $C_{3e}$ relates to the amount of $H_2$ present in the water vapor.

Typically, it is possible to have an imposed oxidant partial pressure of 10%.

In order to achieve these criteria for satisfactory progression of the process, the applicant has demonstrated that it is advantageously possible to define beforehand optimum stabilization temperatures of between 300 and 550° C. These temperatures are carefully chosen in order to promote only the oxidation of the $UC_2$ phase to give $UO_x$, without detrimentally affecting the excess graphite present in the initial $UC_x$ material, the objective being to oxidize as little as possible of the graphite of the material and its container.

This stage of optimization of the oxidation temperature is illustrated below more specifically in the case of a material with the composition $UC_2+2C$. As this $UC_x$ material is multiphase and heterogeneous, its oxidation under isothermal conditions has formed the subject of an in-depth analysis by the applicant. In order to show that the desired response of the material subsequent to the application of a stabilization treatment depends on many parameters and in particular on an optimum range of oxidation temperatures, an example of isothermal networks, obtained by thermogravimetric and differential thermal analyses at an $O_2$ partial pressure of 10%, is represented as a specific example in FIG. 4. Each curve represents the change in the variation in weight of the $UC_x$ material as a function of the time for different oxidation temperatures, denoted $T_{oxidation}$. An increase in weight detected reflects the fact that the $UC_x$ material, with the initial chemical formula $UC_2+yC_F$ ($C_F$ symbolizing the excess graphite present in the initial $UC_x$ material), is oxidized to form a solid chemical compound of $UO_z+yC_F$ and/or $UO_z$ type. When a loss in weight is measured, it reflects the fact that the oxidation of a reactive solid to give a gas takes place, which corresponds, in the present case, to the oxidation of a carbon-comprising form to give $CO/CO_2$.

It is thus apparent that, for a temperature $T_{oxidation}$ in the vicinity of 300° C., the kinetics of oxidation of the $UC_x$ material to give the $UO_z$ phase (in this instance, to give $U_3O_8$, by way of example) are gradual and fairly slow.

It should be remembered that the main reaction during the oxidation process is as follows:

$$UC_2+2C_F+4/3O_2 \rightarrow \tfrac{1}{3}U_3O_8+2C_{UCx}+2C_F$$

and results in a theoretical increase in weight $\Delta m_{theoretical}=15\%$. The weight gains obtained should thus be compared with the theoretical weight gains.

At this temperature, no gaseous discharge of $CO_2$ should take place, which was confirmed using a coupled gas analyzer at the outlet of the thermogravimetric device.

For a temperature $T_{oxidation}$ in the vicinity of 400° C., the increase in weight is faster and results in a well-defined stationary state being obtained, showing that the oxidized $UC_x$ material is no longer changing, although the latter is still under an oxidizing atmosphere. This optimum oxidation temperature thus makes possible a rapid and stable conversion of the $UC_x$ material to give the oxide phase (very particularly $U_3O_8$) which is defined in this example by the following reaction:

$$UC_2+2C_F+10/3O_2 \rightarrow \tfrac{1}{3}U_3O_8+2C_F+2CO_2 \quad \Delta m_{theoretical}=7.2\%$$

For a temperature $T_{oxidation}$ of 500° C., the profile of variation in weight during the oxidation of the $UC_x$ reveals an increase followed by a temporary loss in weight which subsequently tends toward a stabilized stationary state $\Delta m$. The increase in weight corresponds to the oxidation of the $UC_2$ phase to give $U_3O_8$ and the loss in weight reflects the oxidation of the residual carbon resulting from the $UC_2$ present in a small amount, which is accompanied by a slight release of $CO_2$. At the end of the oxidation stationary state, the remaining chemical phases are $U_3O_8$ and $C_F$, so that the overall oxidation reaction can be written in the form:

$$UC_2+2C_F+(10/3+\alpha)O_2 \rightarrow \tfrac{1}{3}U_3O_8+(2-\alpha)C_F+(2+\alpha)CO_2 \quad \Delta m_{theoretical} < 7\%$$

For temperatures greater than or equal to 600° C., the profiles of variation in weight simultaneously reveal an increase followed by a gradual loss in weight, the amplitude of which is proportional to the oxidation temperature applied. The $\Delta m$ profiles thus pass through a maximum, also known as overshoot, the amplitude and position of which for one and the same material vary as a function of the oxidation temperature applied. From this point, a strong release of $CO_2$ accompanies this loss in weight, demonstrating the oxidation of all of the excess graphite, in addition to the oxidation of the $UC_x$ to give the $U_3O_8$ form. The rate of oxidation of the 2 phases ($UC_2$ and $C_F$) forming the $UC_x$ material thus depends strongly on the oxidation temperature $T_{oxidation}$ applied.

Figure 4:
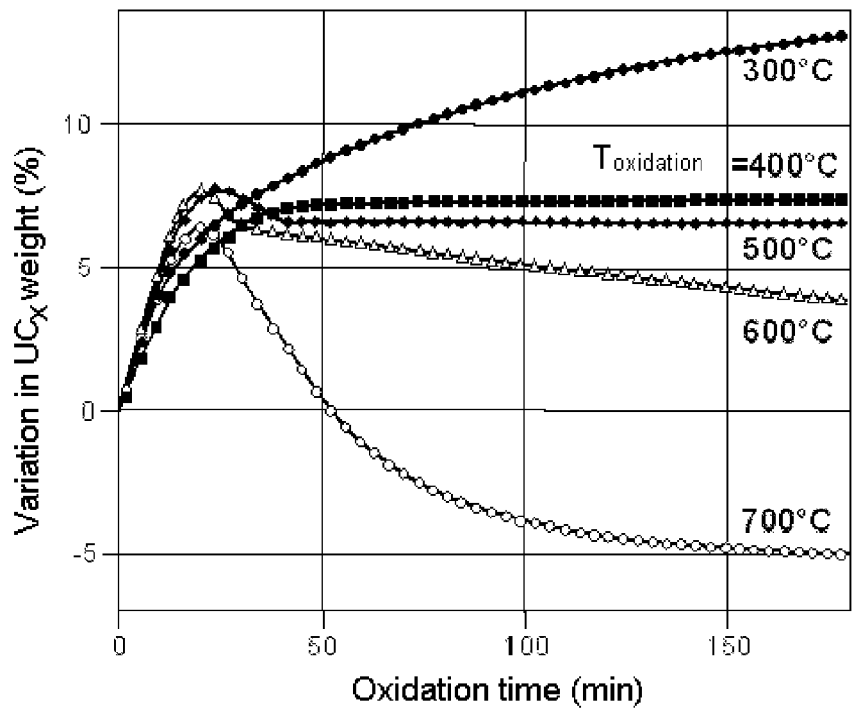
FIG. 4 illustrates the change in the weight of a $UC_x$ compound as a function of the time, for different isothermal oxidation temperatures.

This determination of the oxidation kinetics for the $UC_x$ material and of the influence of the chosen temperature under isothermal conditions thus makes it possible to identify a range of optimum temperatures in the vicinity of 400° C.+/−100° C. for the application of the process of the present invention. These temperatures make it possible to make sure of the complete oxidation of the $UC_2$ phase, this being achieved, all at the same time:

- without completely oxidizing the residual carbon (either resulting from the oxidation of the $UC_x$ ($C_{UCx}$) or initially present ($C_F$)) contained in the targets;
- without requiring a treatment time completely unacceptable at the process level: the thermogravimetric curves presented in FIG. 4 show that the final stabilization of the $UC_x$ material (that is to say, a variation in weight which no longer changes during the oxidation) at a temperature $T_{oxidation}$=400° C. is four times faster than for an oxidation temperature of 700° C., while preventing the oxidation of the residual graphite;
- without excessive overheating of the charge to be stabilized in order to prevent any runaway and also oxidation of other elements not requiring it and which can even be damaging for the treatment of the gases.

Figure 5:
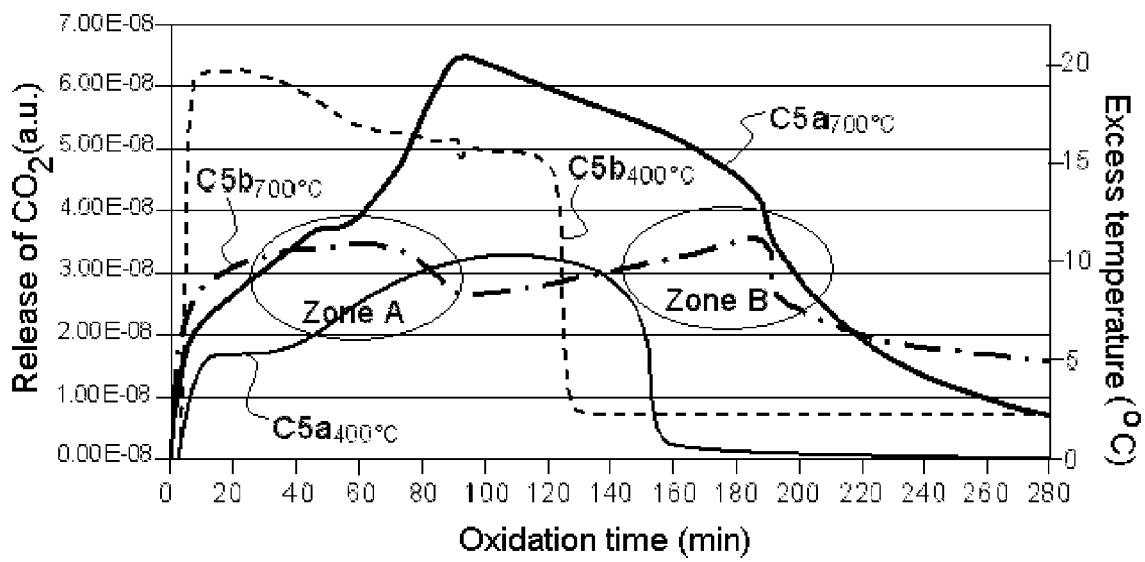
FIG. 5 illustrates the variations in release of $CO_2$ and in local overheating events detected during the application of the process respectively for two different oxidation temperatures ($T_{oxidation}$=400 and then 700° C.)

By way of example, FIG. 5 demonstrates the variations in release of $CO_2$ ($C_{5a\ 400°\ C.}$ and $C_{5a\ 700°\ C.}$) and in overheating events corresponding to local excess temperatures ($C_{5b\ 400°\ C.}$ and $C_{5b\ 700°\ C.}$) detected locally during the application of the process. The data obtained show notably phenomena of recovery of reactivity very particularly with a temperature of 700° C. (identified in FIG. 5 by Zone A and Zone B) which testify to the exothermicity of the reactions involved. Furthermore, still at this oxidation temperature of 700° C., the release still present of $CO_2$ after an oxidation treatment of 280 minutes shows that the stabilization process still remains incomplete. On the other hand, for more moderate temperatures in the vicinity of 400° C., the release of $CO_2$ becomes less than the threshold value (100 ppm) after an oxidation treatment of only 200 min, which means the conversion of virtually all the $UC_x$ material to $UO_x$. Likewise, the phenomena of recovery of thermal reactivity at these "mild" temperatures are much weaker, indeed even nonexistent.

The reactions taking place during the process are schematically as follows (with a priority with regard to the reaction (1)):

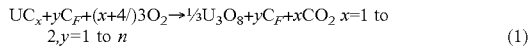

$$UC_x+yC_F+(x+4/)3O_2 \to \frac{1}{3}U_3O_8+yC_F+xCO_2\ x=1\ to\ 2, y=1\ to\ n \quad (1)$$

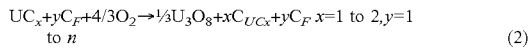

$$UC_x+yC_F+4/3O_2 \to \frac{1}{3}U_3O_8+xC_{UCx}+yC_F\ x=1\ to\ 2, y=1\ to\ n \quad (2)$$

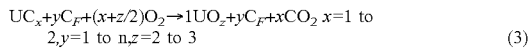

$$UC_x+yC_F+(x+z/2)O_2 \to 1UO_z+yC_F+xCO_2\ x=1\ to\ 2, y=1\ to\ n, z=2\ to\ 3 \quad (3)$$

In contrast, the reactions which are undesirable for the $UC_x$ material are those which involve the oxidation of the carbon at the same time as the oxidation of the $UC_2$ phase and more particularly the free carbon, denoted $C_F$, present in the graphitic form in large amounts in the initial $UC_x$ material (70% by volume). By way of example, a few undesirable reactions are presented below which no longer demonstrate the presence of $C_F$ and/or $C_{UCx}$ carbon in the product of the oxidation reaction.

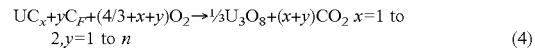

$$UC_x+yC_F+(4/3+x+y)O_2 \to \frac{1}{3}U_3O_8+(x+y)CO_2\ x=1\ to\ 2, y=1\ to\ n \quad (4)$$

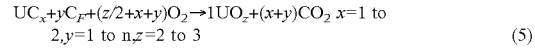

$$UC_x+yC_F+(z/2+x+y)O_2 \to 1UO_z+(x+y)CO_2\ x=1\ to\ 2, y=1\ to\ n, z=2\ to\ 3 \quad (5)$$

Figure 6:
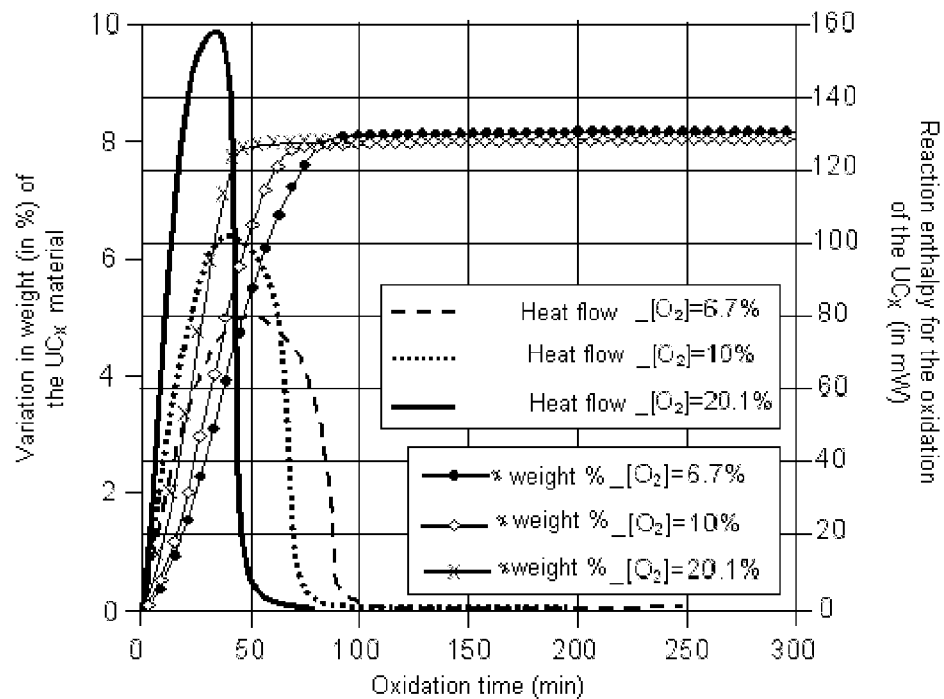
FIG. 6 illustrates the variation in weight as percentage and the heat flow given off, during the oxidation under isothermal conditions of the $UC_x$ for three different concentrations of molecular oxygen.

Optimization of the Oxidant Partial Pressure and of the Heat Given Off:

The applicant has also demonstrated that the oxidant partial pressure and heat given off as a function of time can be optimized. For this, the effect of the $O_2$ partial pressure was studied with regard to the behavior toward the oxidation of the $UC_x$. A specific example is illustrated in FIG. 6, which represents the variation in weight as % (solid lines) and the heat flow given off (dotted lines) during the oxidation under isothermal conditions of the $UC_x$ for an application temperature of the process of 400° C. at 3 different [$O_2$] partial concentrations ([$O_2$]=6.7%, 10% and 21%).

The results obtained show that the $O_2$ partial pressure does not influence the range of application of the process: the variations in weight gain are identical and settle down around a mean final value Δm=+8%, whatever the $O_2$ partial pressure applied. The result of this is that only the $UC_2$ phase is oxidized to give the oxide form of $U_3O_8$ type. The excess graphite $C_F$, for its part, is still present in the oxidized material, thus limiting the generation of carbon dioxide $CO_2$ damaging for the post-treatment management of the gases of the process.

The partial pressure simply plays a role in the kinetics of oxidation of the $UC_x$ and consequently for the treatment time of the process: at high concentration ([$O_2$]=21%, this $O_2$ partial pressure makes it possible to stabilize the $UC_2$ phase of the $UC_x$ only after application of the process for 40 min whereas, at low concentration ([$O_2$]=10%), the stabilization of the $UC_x$ reaches the threshold value Δm=+8% after 70 min.

The $O_2$ partial pressure also plays a role in the values measured for heat flow, which quantities are characteristic of the exothermicity given off during the reaction for the oxidation of the $UC_x$ to give $U_3O_8$; the maximum amount of heat given off is twice as great when the process for the stabilization of the $UC_x$ is carried out with an $O_2$ partial concentration varying from 6.7% to 21%. As it is possible for this amount of instantaneous heat given off to negatively impact the process in the case where the increase in the local excess temperature might result in an increase in the overall oxidation temperature greater notably than the value $T_{max}$ (defined as being the temperature at which the oxidation of the excess carbon begins), it is essential to establish optimum experimental conditions which make it possible to find a compromise between rate of conversion and control of release of heat which may bring about a modification to the reactivity.

Consequently, an $O_2$ partial concentration in the vicinity of 10% thus makes it possible to optimize the time for conversion of the $UC_x$ into the oxide form while limiting the exothermicity given off related to this oxidation reaction.

Optimization of the Temperature of the Stabilization Heat Treatment:

The weight gains obtained at oxidation temperatures varying from 380 to 550° C. and the stabilization of these quantities around a threshold value Δm=[6,8]% define the robustness of the process with respect to the temperature for application of the treatment of the process, making possible the sole and controlled conversion of the $UC_2$ phase of the $UC_x$ material into the oxide form of $U_3O_8$ type (with possible traces of $UO_2$).

Figure 7:
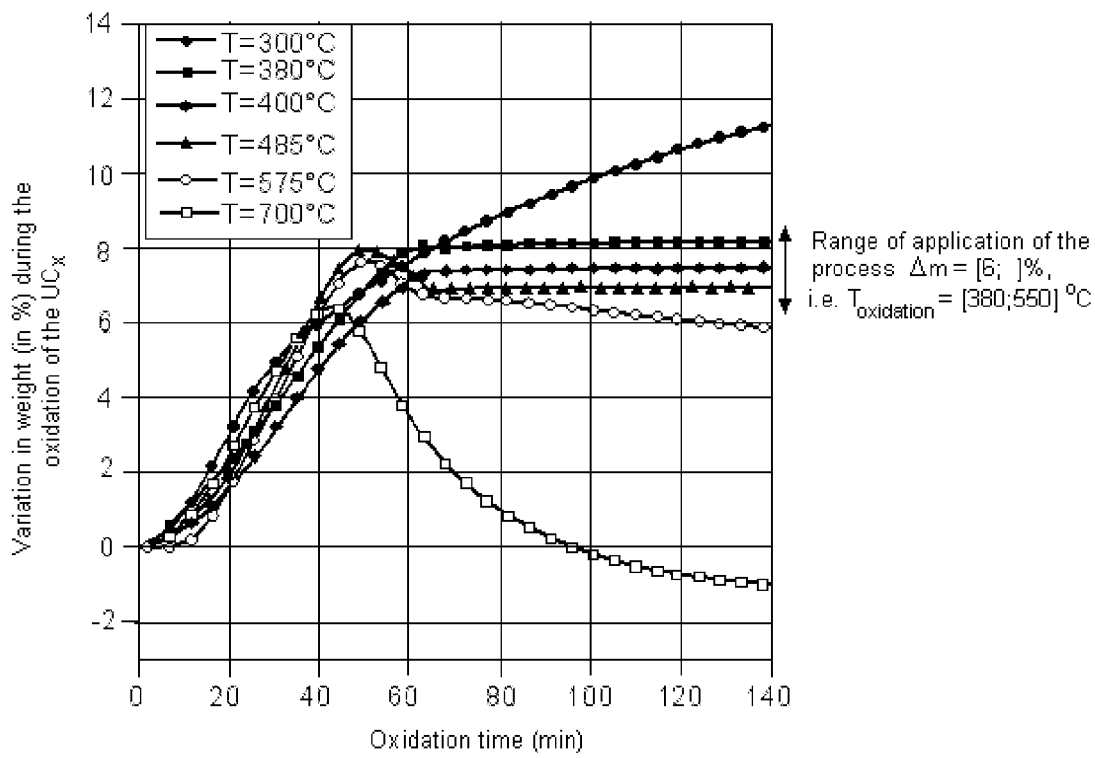
FIG. 7 illustrates the profiles for variations in weight obtained during the oxidation of the $UC_x$ under an oxidizing atmosphere under isothermal conditions for different oxidation temperatures.

FIG. 7 presents an isothermal network obtained around an optimum application temperature of the process of 400° C. The profiles obtained (produced under similar isothermal conditions to those obtained in FIG. 3) make it possible to test the robustness of the process by determining the maximum temperature which will result in the oxidation of the excess carbon in the thermogravimetric curves presented.

It should be noted that the thermogravimetric curves obtained from oxidation temperatures greater than 550° C. (2 thermogravimetric curves obtained at $T_{oxidation}$=575° C. and then 700° C. represented, for example, in FIG. 7) demonstrate a loss in weight which is increasingly great and decreasingly linear: they emphasize the gradual oxidation of the excess carbon $C_F$, which becomes increasingly pronounced as a function of the increase in oxidation temperature.

Optimization of the Process of the Invention by Addition of Water Vapor:

The applicant has also studied the addition of water vapor before and during the isothermal cycle of the treatment of the process and has been able to demonstrate the following conclusions:

- an effect of the water vapor on the rate of conversion of the $UC_x$ material into $UO_x$ under an oxidizing atmosphere, whatever the time of the addition of water vapor (before or during the oxidative treatment);
- the possibility of using a new gaseous tracer $H_2$ related to the reaction between the $UC_x$ and the $H_2O$ according to the reaction:

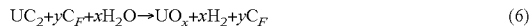

$$UC_2 + yC_F + xH_2O \rightarrow UO_x + xH_2 + yC_F \quad (6)$$

The presence of $H_2$, measured at a concentration with a factor greater than 100 times lower than the $CO_2$ given off during the oxidation of the $UC_x$, can be used in the same way as the latter as factor of criterion for halting the satisfactory progression of the process, this criterion being achieved when the $H_2$ release is less than a minimum threshold value;
- the acceleration in the chemical fragmentation of very dense materials and in the rate of oxidation of the $UC_x$ to give the oxide form (for example, a gain in time of 10 min was measured during an oxidative treatment under isothermal conditions carried out at 420° C.);
- the lowering in the amount of heat given off and consequently the excess temperature $\Delta T$ observed during the process and notably at the start of the exothermic oxidation reaction of the $UC_x$ to give $U_3O_8$ (decrease ET of 8% in the presence of water vapor).

The applicant has also studied the effect of water vapor on the stabilization of the $UC_x$ by environmental scanning electron microscopy. The results of in situ oxidation under environmental electron microscopy at different oxidation temperatures and water vapor partial pressures have made it possible to demonstrate the appearance of localized cracks at the surface of the $UC_x$. These cracks facilitate the interaction between $O_2$ molecules and $UC_2$ clusters which are not very accessible as they are present in the body within the $UC_x$ material. These cracks allow the $O_2$ molecules to more readily reach into the body and to thus greatly improve the overall rate of conversion of the $UC_2$ into the oxide phase. Post-mortem measurements by X-ray diffraction studies on tests of oxidation of $UC_x$ under environmental microscopy at different water vapor partial pressures $P(H_2O)$ have revealed the presence of $UO_2$, $U_3O_8$ and excess carbon in the oxidized material.

The use of a combination of $O_2/H_2O$ reactant in the treatment of the process also makes it possible to involve two types of reaction (corrosion and oxidation) with change in molar volume of the products resulting from the oxidation of the $UC_2$ phase ($UO_2$ and $U_3O_8$ among them). The presence of these two oxides promotes the change in volume of the oxidized product and the appearance of interstitial stresses which result in the appearance of cracks which allow better accessibility of the $O_2$ in contact with nonoxidized surfaces and a significant improvement in the kinetics of treatment.

The addition of water vapor for the process is all the more relevant with regard to bulk and dense initial materials, the core of the material of which is difficult to access for molecular oxygen. The water vapor thus has an influence on the morphology of the initial material to be stabilized.

Figure 8:
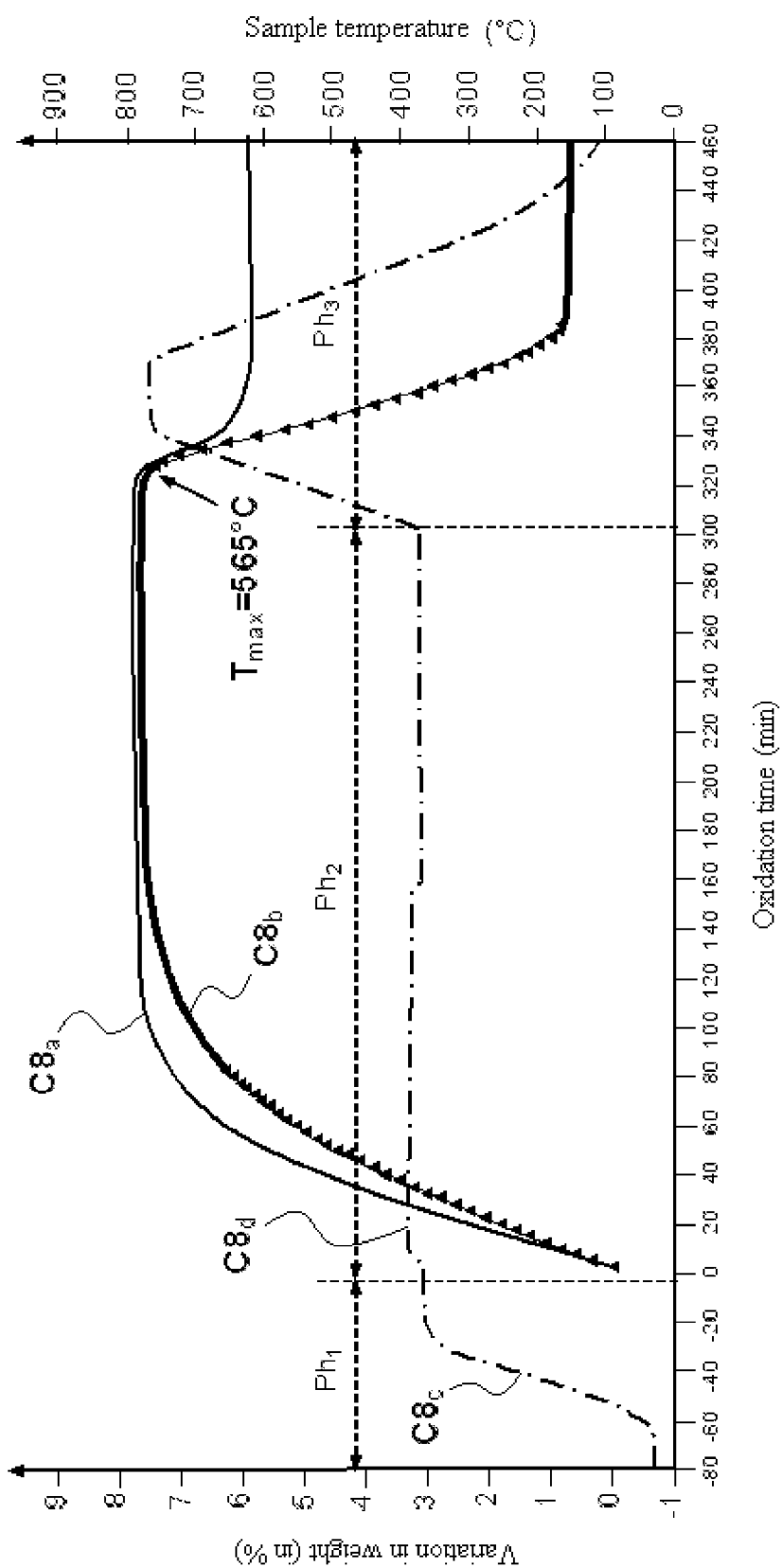
FIG. 8 illustrates the thermogravimetric curves showing the influence of the geometric nature on the process for the stabilization of the $UC_x$ material at moderate temperature $T_{oxidation}=400°$ C.

Validation of the Process of the Invention for Different Types of Morphology of the Uranium Carbide Compound:

The stabilization of the $UC_x$ targets was carried out at a stabilization temperature of 400° C. using two different geometrical forms: $UC_x$ powder (particle size of 150 μm) and an assembly of several $UC_x$ pellets stuck to one another (pellets φ=15 mm, t=1 mm, hydrostatic density=8, porosity>50%). The programming of the isothermal oxidation cycle and the change in weight of these two $UC_x$ geometrical forms during the oxidative treatment are represented in FIG. 8. More specifically, the curve $C_{8a}$ relates to the variation in weight in the case of pellets, the curve $C_{8b}$ relates to the variation in weight in the case of powder, the curve $C_{8c}$ relates to the change in the temperature with pellets and the curve $C_{8d}$ relates to the change in the temperature with powder.

During these tests, an oxidation cycle under anisothermal conditions (rise to $T_{oxidation}$=800° C. with gradient of 10° C./min) was also programmed after applying the process for 300 min in order:

- to determine the maximum temperature $T_{max}$ corresponding to the initiation of the oxidation of the excess carbon of the $UC_x$ material;
- to analyze the differences in weight loss of the excess carbon as a function of the morphological nature of the initial material.

The results obtained thus show that the process of the present invention is:

- applicable for variable $UC_x$ materials of powder or pellet type as the weight gain of the $UC_x$ material (form or powder) during the oxidation tends toward a stationary state equal to $\Delta m$=7.6% in conformity with the achievement of a stabilized final product defined by $U_3O_8+C_F$ and confirmed by X-ray diffraction, XRD;
- optimum for an initial $UC_x$ material of "pellet" geometry as the reaction kinetics relating to the reaction for the oxidation of the $UC_x$ to give $U_3O_8$ are faster (stationary state $\Delta m$ reached sooner) and less exothermic than in the case of a geometry of "powder" type (stationary state $\Delta m$ reached more rapidly and local excess temperature $\Delta T$ with a lower and shorter amplitude);
- adjustable with regard to the treatment temperature of the process, whatever the geometrical nature of the $UC_x$. This is because, for both scenarios, the temperature $T_{max}$ corresponding to the initiation of the oxidation of the excess carbon is identical and measured as being equal to 565° C. Experience thus shows that a maximum difference $\Delta T = T_{max} - T_{oxidation}$ is applicable in order to test, at the end of the reaction, the satisfactory progression of the process for the stabilization of the $UC_x$ to give the $UO_x$ form. The process can also be adjusted in both scenarios as the weight gain is identical during the oxidative treatment under isothermal conditions.

The differences recorded for weight loss during the oxidation of the excess carbon show that, beyond a temperature $T_{max}$, the application of the process does not make it possible to completely oxidize the excess carbon $C_F$ present in the initial $UC_x$ material, in particular if the latter has a geometry of "pellet" type. Nevertheless, on the basis of strictly geometrical comparison factors, if the temperature for application of the process has to be greater than the temperature $T_{max}$ (in particular for the test for the end of reaction), the use of a $UC_x$ material of "pellet" type at the expense of a geometry of "powder" type appears beneficial in the sense that the oxidation of the excess carbon is only partial, thus limiting the production of not insignificant amounts of $CO/CO_2$ to be handled after application of the process.

Example of Operating Conditions for the Stabilization Process According to the Invention The initial $UC_x$ material, in the powder or centimeter-sized pellet form, is introduced inside a boat, itself placed inside an oxidizing furnace.

A neutral gas, for example argon, is then introduced into the furnace and a heating cycle of 10° C./min is imposed until a set-point temperature, denoted $T_{oxidation}$, in the vicinity of 400° C. is obtained.

Once this temperature $T_{oxidation}$ has been reached, a stabilization stationary state of 30 min under argon is programmed.

After this stabilization stationary state, reconstituted air, alone or diluted in argon, at an $O_2$ content of 10% is suddenly introduced into the measurement device with a flow rate by volume of gas proportional to the initial amount of $UC_x$.

The oxidation of the $UC_x$ under isothermal conditions at a stabilization temperature $T_{oxidation}=400°$ C. then gets under way for a mean time of 5 h and a gas analysis system makes it possible to monitor, in real time, very particularly the consumption of $O_2$ and the release of $CO_2$ produced during the oxidation of the $UC_x$ to give $U_3O_8$.

When the concentration of $O_2$ reaches the set point imposed at the inlet of the process (preferably 10% as content by volume) and when the concentration of $CO_2$ indicates a value of less than 100 ppm, a test of confirmation of recovery of reactivity is carried out. This test consists, for example, in increasing the temperature rapidly but in a controlled fashion above the set point, typically by $\Delta T=+50°$ C., and measuring the change in the $O_2$ and the $CO_2$ during this change in temperature. A variation in pressure and/or insertion of a water vapor partial pressure can also be envisaged as stress criteria/tests.

In the absence of release of $CO_2$ greater than a threshold value (100 ppm) and/or consumption of $O_2$ during this test, cooling of the furnace is programmed under air (cooling of several tens of ° C./min).

In the presence of release of $CO_2$ and/or consumption of $O_2$ during this test for the end of reaction, the stabilization of the $UC_x$ at a new temperature $T_{oxidation}+\Delta T$ is continued as long as the amounts of $CO_2$ are not less than the threshold value (100 ppm). An addition of water vapor to the oxidizing atmosphere can be envisaged in order to substantially accelerate the complete stabilization of the $UC_x$ in the $UO_x$ form. The presence of water vapor will also make it possible to monitor a new tracer, $H_2$, which appears during the residual oxidation of $UC_x$ to give the oxide form. These temperature tests are carried out as long as the overall temperature imposed does not exceed a maximum value corresponding to the oxidation of the excess carbon present in the $UC_x$ material ($T_{max}$ in the vicinity of 560° C.). In the absence of new releases of gas, the furnace is cooled under conditions similar to those established in the case of the negative response to the test for the end of reaction.

The oxidized residue, with the composition $U_3O_8+C_{Free}$ and in the powder final state, is then collected and packaged according to the standards of the outlet envisaged. A sample is also taken for analysis by X-ray diffraction, XRD.

The invention claimed is:

1. A process for the chemical stabilization of a uranium carbide composite material corresponding to: $UC_x+yC$ with $x \geq 1$ and $y > 0$, placed in a stabilization chamber, comprising the following stages:

a stage of rise in temperature of the internal temperature of said chamber to a temperature of between approximately 380° C. and 550° C., said chamber being fed with an inert gas consisting of one or both of argon and nitrogen;

a stage of isothermal oxidative treatment at said temperature of between approximately 380° C. and 550° C., said chamber being placed under $O_2$ partial pressure; and a stage of controlling the completion of the stabilization of said composite material which comprises monitoring of the amount of molecular oxygen consumed and/or of carbon dioxide given off or of carbon dioxide and carbon monoxide given off, until at least the achievement of a value of an input set point for the molecular oxygen, of a minimum threshold value for said amount of carbon dioxide or of threshold values for the carbon dioxide and carbon monoxide.

2. The process for the chemical stabilization of a uranium carbide composite material as claimed in claim 1 wherein the stage of controlling the completion of the stabilization additionally comprises monitoring of variation in weight of the composite material based on carbon and uranium in the chamber, an increase in weight being correlated with the oxidation of uranium carbide in progress.

3. The process for the chemical stabilization of a uranium carbide composite material as claimed in claim 1, wherein the stage of controlling the completion of the stabilization is carried out with the application of a rise in temperature of the internal temperature of said chamber and the monitoring of $CO_2$ given off.

4. The process for the chemical stabilization of a uranium carbide composite material as claimed in claim 1, comprising the introduction of a water vapor partial pressure into said chamber before and/or during and/or after the isothermal oxidative treatment stage.

5. The process for the chemical stabilization of a uranium carbide composite material as claimed in claim 4, wherein the stage of controlling the completion of the stabilization further comprises detection of $H_2$ as marker for monitoring an end of oxidation in said chamber.

6. The process for the chemical stabilization of a uranium carbide composite material as claimed in claim 2, wherein the stage of controlling the completion of the stabilization comprises an operation of overpressurizing a plurality of reaction gases present in said chamber so as to accelerate the end of the oxidation of said composite material.

7. The process for the chemical stabilization of a uranium carbide composite material as claimed in claim 6, wherein the stage of controlling the completion of the stabilization additionally comprises a cycle of an operation of overpressurizing and an operation of underpressurizing the reaction gases present in said chamber.

8. The process for the chemical stabilization of a uranium carbide composite material as claimed in claim 2, in which said composite material exhibits a morphology of powder or of porous or dense pellet.

9. The process for the chemical stabilization of a uranium carbide composite material as claimed in claim 2, comprising a preliminary stage of determination of an optimum oxidation temperature by thermogravimetric analysis of a sample of $UC_x+yC$ composite material.

* * * * *